US012182829B2

(12) United States Patent
Chakraborty et al.

(10) Patent No.: US 12,182,829 B2
(45) Date of Patent: Dec. 31, 2024

(54) GENERATING CONCISE AND COMMON USER REPRESENTATIONS FOR EDGE SYSTEMS FROM EVENT SEQUENCE DATA STORED ON HUB SYSTEMS

(71) Applicant: Adobe Inc., San Jose, CA (US)

(72) Inventors: Sarthak Chakraborty, West Bengal (IN); Sunav Choudhary, West Bengal (IN); Atanu R. Sinha, Bangalore (IN); Sapthotharan Krishnan Nair, Santa Clara, CA (US); Manoj Ghuhan Arivazhagan, Tamil Nadu (IN); Yuvraj, Punjab (IN); Atharva Anand Joshi, Maharashtra (IN); Atharv Tyagi, Delhi (IN); Shivi Gupta, Deli (IN)

(73) Assignee: Adobe Inc., San Jose, CA (US)

( * ) Notice: Subject to any disclaimer, the term of this patent is extended or adjusted under 35 U.S.C. 154(b) by 189 days.

(21) Appl. No.: 17/849,320

(22) Filed: Jun. 24, 2022

(65) Prior Publication Data

US 2023/0419339 A1 Dec. 28, 2023

(51) Int. Cl.
*G06Q 30/0201* (2023.01)
*G06N 3/04* (2023.01)
*G06Q 30/0251* (2023.01)

(52) U.S. Cl.
CPC ........... *G06Q 30/0201* (2013.01); *G06N 3/04* (2013.01); *G06Q 30/0255* (2013.01); *G06Q 30/0269* (2013.01)

(58) Field of Classification Search
CPC .......... G06Q 30/0201; G06Q 30/0255; G06Q 30/0269; G06N 3/04; G06N 3/044; G06N 3/045
See application file for complete search history.

(56) References Cited

U.S. PATENT DOCUMENTS 10,614,381 B2 * 4/2020 Hoffman ................. G06T 11/00
10,873,782 B2   12/2020 Lomada et al.
(Continued)

OTHER PUBLICATIONS

Gong et al., EdgeRec: Recommender System on Edge in Mobile Taobao, CIKM '20: Proceedings of the 29th ACM International Conference on Information & Knowledge Management, Applied Research Track, Oct. 19- 23, 2020, pp. 2477-2484.

(Continued)

*Primary Examiner* — Dylan C White
(74) *Attorney, Agent, or Firm* — Kilpatrick Townsend & Stockton LLP

(57) ABSTRACT

A system includes a representation generator subsystem configured to execute a user representation model and a task prediction model to generate a user representation for a user. The user representation model receives user event sequence data comprises a sequence of user interactions with the system. The task prediction model is configured to train the user representation model. The user representation includes a vector of a predetermined size that represents the user event sequence data and is generated by applying the trained user representation model to the user event sequence data. A storage requirement of the user representation is less than a storage space requirement of the user event sequence data. The system includes a data store configured for storing the user representation in a user profile associated with the user.

11 Claims, 8 Drawing Sheets

(56) References Cited

U.S. PATENT DOCUMENTS

| | | | |
|---|---|---|---|
| 11,037,060 B2* | 6/2021 | Nguyen | G06N 3/08 |
| 11,151,468 B1* | 10/2021 | Chen | G06N 7/01 |
| 11,269,870 B2 | 3/2022 | Bhatia et al. | |
| 11,461,634 B2* | 10/2022 | Bhatia | G06N 3/04 |
| 11,853,817 B2* | 12/2023 | Kulkarni | G06F 9/542 |
| 2018/0174070 A1* | 6/2018 | Hoffman | G06N 7/01 |
| 2020/0005196 A1* | 1/2020 | Cai | G06F 16/9535 |
| 2020/0104697 A1* | 4/2020 | Bhatia | G06N 3/04 |
| 2023/0351225 A1* | 11/2023 | Shalaby | G06N 5/022 |
| 2024/0005386 A1* | 1/2024 | Thurairatnam | G06Q 20/3223 |

OTHER PUBLICATIONS

Guo et al., DeepFM: A Factorization-Machine based Neural Network for CTR Prediction, Proceedings of the Twenty-Sixth International Joint Conference on Artificial Intelligence (IJCAI-17), Aug. 2017, pp. 1725-1731.

Huang et al., Learning Deep Structured Semantic Models for Web Search using Clickthrough Data, CIKM '13: Proceedings of the 22nd ACM international conference on Information & Knowledge Management, Oct. 27-Nov. 1, 2013, pp. 2333-2338.

Li et al., UserBERT: Self-supervised User Representation Learning, ICLR 2021 Conference Blind Submission, 2021, 12 pages.

Ni et al., Perceive Your Users in Depth: Learning Universal User Representations from Multiple E-commerce Tasks, Proceedings of the 24th ACM SIGKDD International Conference on Knowledge Discovery & Data Mining, Aug. 19-23, 2018, pp. 596-605.

Tang et al., Joint User-Entity Representation Learning for Event Recommendation in Social Network, Institute of Electrical and Electronics Engineers 33rd International Conference on Data Engineering (ICDE), Apr. 19-22, 2017, pp. 1-10.

Yuan et al., One Person, One Model, One World: Learning Continual User Representation without Forgetting, SIGIR '21: Proceedings of the 44th International Acm Sigir Conference on Research and Development in Information Retrieval, Jul. 11-15, 2021, pp. 689-705.

Yuan et al., Parameter-Efficient Transfer from Sequential Behaviors for User Modeling and Recommendation, SIGIR '20: Proceedings of the 43rd International ACM SIGIR Conference on Research and Development in Information Retrieval, Jul. 25-30, 2020, pp. 1469-1478.

Zolna et al., User Modeling Using LSTM Networks, Proceedings of the Thirty-First AAAI Conference on Artificial Intelligence (AAAI-17), vol. 31, No. 1, Feb. 12, 2017, pp. 5025-5026.

* cited by examiner

300

310
ACCESSING A TRAINING DATA SET ASSOCIATED WITH A USER IDENTIFIER

320
APPLYING A USER REPRESENTATION MODEL TO THE TRAINING DATA SET TO GENERATE A USER REPRESENTATION

321
APPLYING A TASK SPECIFIC EMBEDDING MODEL TO THE TRAINING DATA SET TO GENERATE A TASK SPECIFIC EMBEDDING

323
APPLYING A MULTITASK EMBEDDING MODEL TO THE TRAINING DATA SET TO GENERATE A MULTITASK EMBEDDING

325
APPLYING A TASK AGNOSTIC EMBEDDING MODEL TO THE TRAINING DATA SET TO GENERATE A TASK AGNOSTIC EMBEDDING

330
TRANSMITTING THE USER REPRESENTATION TO THE EDGE SYSTEM, WHEREIN THE EDGE SYSTEM APPLIES ONE OR MORE MACHINE LEARNING BASED PROCESSES TO THE USER REPRESENTATION TO GENERATE A PREDICTION

*FIG. 3*

GENERATING CONCISE AND COMMON USER REPRESENTATIONS FOR EDGE SYSTEMS FROM EVENT SEQUENCE DATA STORED ON HUB SYSTEMS

TECHNICAL FIELD

This disclosure generally relates to machine learning techniques for representing user profile data. More specifically, but not by way of limitation, this disclosure relates to machine learning models for concisely representing a user's event sequence data.

BACKGROUND

Conventional service systems include a hub system, which may serve as principle data centers, and one or more edge systems. Edge systems are separate from the hub system and are used for storing data and making it available to applications and services, such as machine learning based decisioning, targeting, prediction, and/or segmentation services. Service systems rely on user profile data for performance of such machine learning based services. User profile data can include event sequence data such as a time series of user events and attributes computed from the time series.

SUMMARY

The present disclosure describes techniques for generating a user representation based on user event sequence data. The concise user representation is stored in a hub system as part of a user profile. To create the concise user representation, a hub system includes a representation generator subsystem configured to execute a user representation model and a task prediction model to generate the user representation for a user. The user representation model receives user event sequence data comprises a sequence of user interactions with the system. The user representation model may be a task specific learning model that generates the user representation in the form of a task specific embedding, a multitask learning model that generates the user representation in the form of a multitask embedding or a task agnostic learning model that generates the user representation in the form of a task agnostic embedding. The task prediction model is configured to train the user representation model when the user representation model is implemented as a task specific learning model or a multitask learning model case. The user representation includes a vector of a predetermined size that represents the user event sequence data and is generated by applying the trained user representation model to the user event sequence data. A storage requirement of the user representation is less than a storage space requirement of the user event sequence data. The system includes a data store configured for storing the user representation in a user profile associated with the user. The user representation significantly reduces the amount of data storage required at both the hub system and edge systems and improves efficiency of running machine learning models for services rendered at the edge systems.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts a method for generating a user representation by applying the user representation model of FIG. 2 to the user event sequence data, according to certain embodiments disclosed herein.

DETAILED DESCRIPTION

Figure 1:
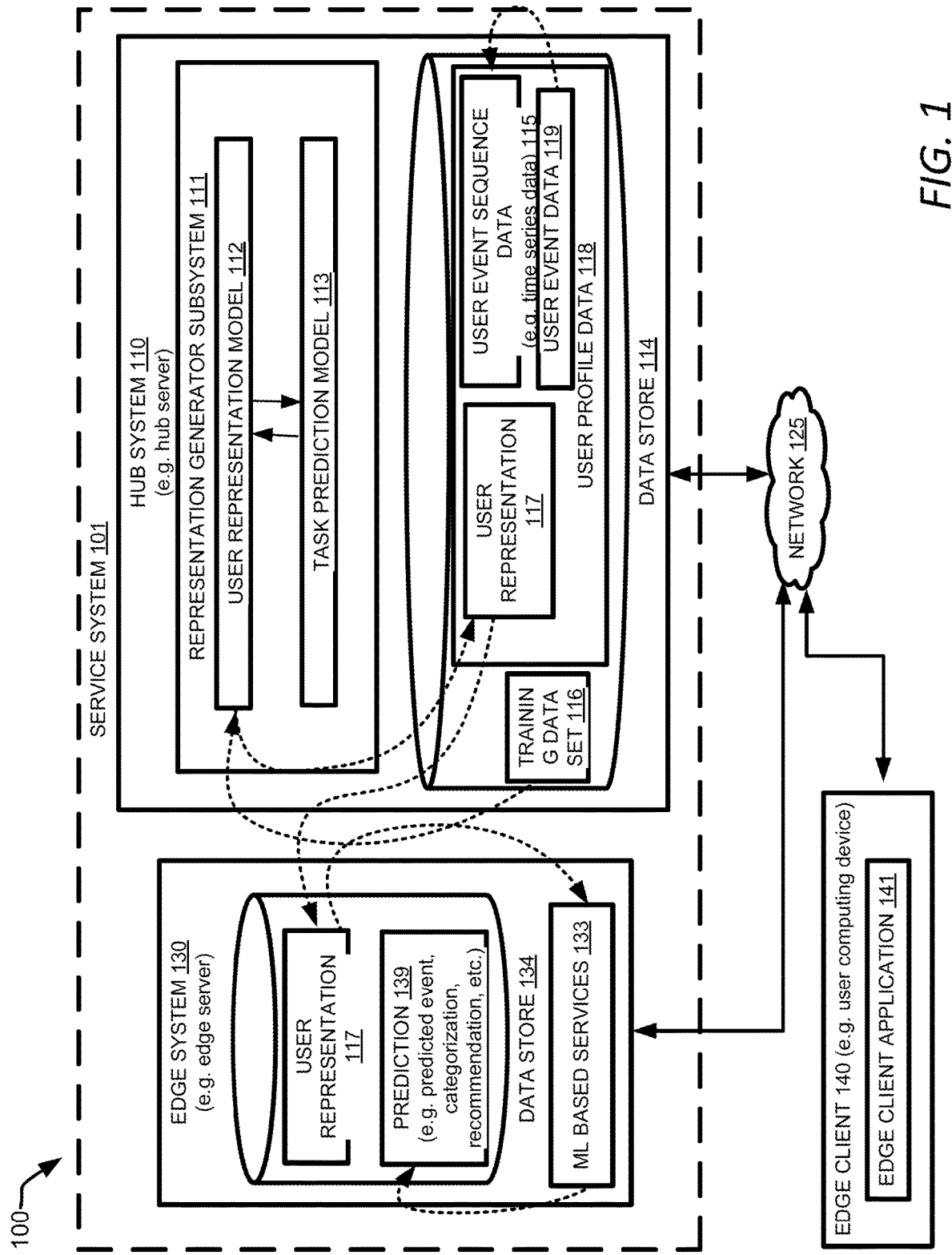
FIG. 1 depicts an example of a computing environment for generating a user representation from user event sequence data, according to certain embodiments disclosed herein.

In the following description, for the purpose of explanation, specific details are set forth in order to provide a thorough understanding of certain embodiments. However, it will be apparent that various embodiments may be practiced without many or all of these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional service systems by providing a machine learning model to generate concise user representations from event sequence data. A service system is typically a network-based computing system including network-connected servers configured to offer services and content via websites, mobile applications, and other means, allowing end users (e.g., marketers and/or consumers) to interact with the servers using network-connected computing devices (e.g. personal computers and mobile devices). In some instances, service systems include a hub system and one or more edge systems. The hub system may function as the principal data center of the service system. The edge systems may provide, among other services, certain machine learning based services that rely on user profile data.

User profile data is typically stored in a data store that is part of or otherwise accessible by the hub system. Portions of the user profile data may be pushed to one or more edge systems for use in performance of the machine learning based services. For example, machine learning based services can include decisioning, targeted recommendation of content, personalization, prediction, propensity scoring, user segmentation, and other services. User profile data, in some instances, includes data indicating demographic information of the end user (e.g. interests, preferences, address, age, education, etc.), user interaction events, and event sequence data determined from the user interaction events. The event sequence data can include a sequence of user interaction events including, for each event, an event type (e.g. a click, a purchase, a view) and a time associated with the event. Further, user profile data, in some instances, includes attributes computed from the user interaction events and/or event sequence data. As an example, attributes may include a total number of events of a particular type, a number of events of a particular type within a time period, etc.

In some conventional service systems, computed attributes from the user profile data are provided as input to the machine learning models that are used for rendering machine learning based services on edge systems. The use of computed attributes, rather than full event sequence data sets, reduces the amount of the user profile data needed on the edge system. However, the number of computed attributes needed for a given type of machine learning model can be substantial, for example, hundreds of computed attributes. The number of computed attributes needed for operation of a conventional service system also increases proportionally to the number of machine learning based services that are powered by the user profile data. This represents a significant overhead cost for storage of computed attributes in hub systems. In addition, continuous collection of event sequence data and computation of large numbers of attributes consumes significant processing resources and other computing resources of the hub system.

Conventional edge systems also have storage space constraints such that storing such a large quantity of computed attributes is not feasible and/or is cost prohibitive. Transferring large volumes of computed attributes from a hub system to an edge system also carries significant bandwidth cost and results in inefficient utilization of computing resources. Accordingly, service systems cannot easily store sufficient computed attributes data on edge system and/or move sufficient computed attributes data to an edge system on demand to provide varied and robust machine learning based services. To address these storage costs and constraints, conventional service systems may reduce the number of the computed attributes to be pushed to and stored on the edge server. For example, a conventional service system may retain, for storage on the edge server, only a predefined number of computed attributes (e.g. a first four attributes) of a total number of attributes (e.g. 200 attributes or other total number of attributes) computed from event sequence data associated with a user. However, reducing the number of stored computed attributes also reduces a breadth of user profile information (particularly, of event sequence data) represented by the computed attributes and may therefore decrease the breadth of machine learning based services that edge systems can offer. For example, some machine learning based services may not be able to provide an output when particular computed attributes are eliminated from the full set of computed attributes representing user profile data. The accuracy of outputs of certain machine learning based services may decrease when the breadth of computed attributes used as input is reduced.

A user representation model that generates a concise user representation based on user event sequence data from user profile data is described herein. The concise user representation reduces storage overhead while still representing a full breadth of user event sequence data, and can be used in a variety of edge system services without sacrificing an accuracy of outputs of such services. Specifically, certain embodiments described herein apply a machine learning model (referred to herein as a user representation model) to event sequence data to generate a concise user representation that represents the essence of a voluminous set of user interaction events and effectively replaces many computed attributes. The machine learning model is trained using a task prediction model, which assesses the predicting power of the user representation. The resulting user representation requires significantly less event sequence data and significantly fewer computed attributes.

Generating the user representation according to the described embodiments can thus significantly reduce the above-mentioned storage overhead and inefficient use of computing resources at the hub system. For example, compared to storing one month of user event sequence data on an edge server, generating the user representation as described herein, in some instances, can result in a reduction of storage overhead on the hub server by a factor of between 42 to 84. For example, compared to storing computed attributes data representing one month of user event sequence data, generating the user representation as described herein, in some instances, can result in a reduction of storage overhead on the hub server by a factor of between 11 to 22. Computing resources are also consumed more efficiently because significantly fewer attributes are computed. The user representation generated in the embodiments described herein has a fixed size (e.g. a vector of a predefined number of dimensions), meaning that a greater reduction in storage overhead is achieved as the size of user event sequence data increases. For example, a conventional hub system may store six months of event sequence data. Replacing this data with the concise user representation described herein can reduce the storage requirement by a further factor of six because the user representation size does not increase relative to the length of the event sequence data represented in the user representation.

Edge systems also gain significant efficiencies when using the concise user representation for rendering machine learning based services. As described, the user representation is relatively small in size but still represents a full breadth of user event sequence data. The storage and computing resources of the edge system can therefore be used more efficiently to provide a variety of matching learning based services. Rendering those same services in conventional service systems would require significantly more data, i.e., a large volume of computed attributes. Network bandwidth is also conserved by transmitting the user representation from the hub system to the edge system as compared to transmitting a high volume of computed attributes.

The following non-limiting example is provided to introduce certain embodiments. In this example, a hub system accesses event sequence data associated with a user from a data store or data lake accessible by the hub system. The hub system applies a trained user representation model to the event sequence data to generate a user representation. The user representation model may be a task specific learning model that generates the user representation in the form of a task specific embedding, a multitask learning model that generates the user representation in the form of a multitask embedding or a task agnostic learning model that generates the user representation in the form of a task agnostic embedding. The user representation comprises a fixed dimensional vector that represents the user event sequence data. The user representation can be used for performing a variety of machine learning based services (e.g. decisioning, targeting, prediction, segmentation, recommendation, etc.). For example, the hub system may transmit the user representation to one or more edge systems where the machine learning based services are provided to an end user, such as a consumer or marketer.

As used herein, the terms "hub system" and "hub server" are used to refer to a server or other computing device of a service system which stores user profile information of a user. The hub system, in certain embodiments, has a greater storage capacity than edge systems of the service system. The hub system generates a user representation based on event sequence data associated with a user.

As used herein, the terms "edge system" and "edge server" are used to refer to servers, which are communicatively coupled (e.g. via a network connection) to the hub server, and which provide services to users. In some instances, an edge system provides machine learning based services, which may involve one or more of prediction, decisioning, recommendation, classification, segmentation or other services. In some instances, edge systems, receive a user representation for the user generated by the hub server and apply machine learning models to the user representation to generate output data (e.g. a prediction, decision, recommendation or targeted content for use in providing services to the user.

As used herein, the terms "user profile data" and "user profile" are used to refer to data associated with a user to which the service system (e.g. the hub server and one or more edge servers) provides services. User profile data can include demographic and other qualitative information of the user (e.g. a name, an address, an age group, a birthdate, interests, etc.), user event data, user event sequence data generated based on the user event data, as well as attributes computed from the user event sequence data.

As used herein, "events" are the actions that are performed by a user. For example, events can include user interface interactions (e.g. clicks, views, opening of documents, or other user interface interactions), purchases, additions of items to wish list or shopping cart, or other interactions by the user with the service system. In certain examples, events are used to construct user event data.

As used herein, the terms "event data" and "user event data" are used to refer to data representing user events that are logged by the service system. In some instances, the service system, when logging the event, logs a time stamp indicating the time at which the event occurred as well as an event type indicating a type of the user interaction (e.g. a click, a subscription, a conversion, a view, etc.). For example, a user interacts with one or more services of the service system via a web browser application or standalone service system application downloaded onto the user computing device and the service system logs the associated user events and user event data.

As used herein, the terms "event sequence data" and "user event sequence data" are used to refer to a sequence of events. For example, the event data includes, for each event, a time stamp and an event type and the event sequence data is generated by ordering the user event data chronologically according to the time of occurrence indicated via the time stamps. For example, a portion of event sequence data for a user may include four events: {event type A, Apr. 6, 2022 08:51; event type B, Apr. 6, 2022 12:04; event type C, Apr. 6, 2022; event type B, Apr. 6, 2022 17:08}. As shown in this simple example, the event sequence data indicates, for each event, an event as well as a time stamp indicating a date and time associated with the event.

As used herein, the term "concise user representation" or simply "user representation" is used to refer to an embedding generated by applying a user representation model to user event sequence data determined from user profile data. An embedding is a low-dimensional representation of high-dimensional data and can be expressed as a vector. For example, the embedding represents user event sequence data that can include hundreds or thousands of events (with associated event types and times of occurrence) with a single vector. In certain embodiments, the user representation is a vector of a predefined size (e.g. a predefined number of dimensions). For example, the vector is a 16-dimension vector, 32-dimension vector, or a vector of another predefined number of dimensions. The user representation, in some instances, is not interpretable. In other words, the vector represents the event sequence data as a whole and each of the events in the event sequence data are not individually identifiable within any specific portion of the user representation. The user representation can be used as input to machine learning models to perform a variety of machine learning based services. For example, edge servers providing services can apply various machine learning models to the same user representation to generate a variety of predictions, classifications, recommendations, or other information.

As used herein, "tasks" are specific actions that a user may take in response to being presented with certain content or services. For example, a task may the opening of an email, clicking on an advertisement, subscribing to or unsubscribing from an email list. In some embodiments, machine learning based services are used to help marketers predict tasks that are likely be performed by users in certain contexts.

Example Operating Environment for Generating a User Representation from User Event Sequence Data Referring now to the drawings, FIG. 1 depicts an example of a computing environment 100 for generating a user representation 117 from user event sequence data 115. The computing environment 100 includes a service system 101, which can include a hub system 110 and one or more edge systems 130. The hub system 110 includes processing devices that execute a representation generator subsystem 111, which applies a user representation model 112 to the user event sequence data 115 to generate the user representation 117. The a representation generator subsystem 111 also includes a task prediction model 113, which is used in training the user representation model 112 using a training data set 116 selected from the user event sequence data 115.

In certain embodiments, hub system 110 is a network server (e.g. a hub server) or other computing device connected to a network 125. The hub system 110 applies a user representation model 112 to user event sequence data 115 stored in a data store 114, either as part of or associated with a user profile 118 of a user, to generate a user representation 117. The represented user may be associated with one or more edge clients 140. Edge clients 140 may be client computing devices, such as personal computers, mobile devices, tablets, etc. In other embodiments, edge clients 140 may be applications or other processes executed by or interacting with an edge system 130. Further details about the user representation model 112 are described in FIG. 2 and a method to apply the user representation model 112 to the user event sequence data 115 is described in FIG. 3.

In certain examples, the hub system 110 generates the user event sequence data 115. Further details about generating the user event sequence data 115 is described in FIG. 4 herein. In certain embodiments, the hub system 110 stores the user event sequence data 115 in a data store 114 and associates the user event sequence data 115 with a user profile 118.

The representation generator subsystem 111, including the user representation model 112 and the task prediction model 113 may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the hub system 110 can be implemented using more or fewer systems or subsystems than those shown in FIG. 1, may combine two or more subsystems, or may have a different configuration or arrangement of the systems or subsystems.

The representation generator subsystem 111 is configured to receive or otherwise access user event sequence data 115. The user event sequence data 115 may be collected, in some instances, from one or more edge clients 140 associated with a user. For example, a user interacts with one or more services of the service system 101 (e.g. via a web browser application or standalone service system application downloaded onto the user computing device) and the service system 101 logs events of the user. The user event sequence data 115 includes, for example, clicks, pages visited, items purchased, items added to a shopping cart, items viewed, as well as time stamps indicating a date/time associated with each of the events, to generate event sequence data associated with the user. Further details about generating the user event sequence data 115 is described herein in FIG. 4.

In some instances, the representation generator subsystem 111 receives a request to generate a user representation 117 from an edge system 130 via the network 125. In certain embodiments, the representation generator subsystem 111 generates the user representation 117 and transmits the user representation 117 to one or more edge systems 130 of the service system 101 via the network 125. In other instances, the representation generator subsystem 111 is configured to generate a user representation 117 without or prior to receipt of a request from an edge system 130.

To generate a user representation 117, the representation generator subsystem 111 employs a user representation model 112, which is trained using a task prediction model 113. Additional details about the user representation model 112 and task prediction model 113 are provided below with respect to FIG. 2. Additional details about generating the user representation 117 by applying a trained user representation model 112 are provided below with respect to FIG. 3. In certain examples, the user representation model 112 is configured to generate a user representation 117 in the form of a task specific embedding 201. In certain examples, the user representation model 112 is configured to generate a user representation 117 in the form of a multitask embedding 202. In certain examples, the user representation model 112 is configured to generate a user representation 117 in the form of a task agnostic embedding 203. In certain examples, the user representation 117 is transmitted or projected to the edge system 130, which can store the user representation 117 in a data store 134 and use the user representation 117 in one or more machine learning based services 133.

The task prediction model 113 included in the representation generator subsystem 111 is used to train the user representation model 112 using the training data set 116. The training data set 116 may be a subset of the user event sequence data 115. In various examples, the task prediction model 113 can be implemented as one or more of program code, program code executed by processing hardware (e.g., a programmable logic array, a field-programmable gate array, etc.), firmware, or some combination thereof.

In certain examples, the edge system 130 executes an edge processing system to provide one or more machine learning based services 133. The machine learning based services 133 use the user representation 117 to generate the service output, such as a recommendation, decision or personalized content. In some embodiments, a machine learning based service 133 includes the same or substantially the same task prediction model 113 that was used to train the user representation model 112 on the hub system. The machine learning service 133 can thus use the user representation 117 to generate a task prediction 139 based on live user event data received from the edge client 140. The task predictions 139 can be used for or factored into the service output. For example, a machine learning based service 133 may be designed to predict whether a user will perform a particular task given current interactions with the edge processing subsystem 131 and/or other network resources. In other examples, machine learning based services 133 may be designed to recommend content or generate customized content for the user, or to perform user segmentation, classification, propensity scoring and/or services. In certain examples, the edge system 130 communicates with an edge client 140 (e.g. a user computing device or application), for example, via an edge client application 141. The edge client 140 may submit requests and/or other data, including live user event data, to the machine learning based services 133 via the network 125. The request may include as a request for a decision or a prediction or a request for content, etc. The edge client 140 may likewise receive the requested decision, prediction, content or other service output from the edge system 130 via the network 125.

Example of an User Representation Model

Figure 2:
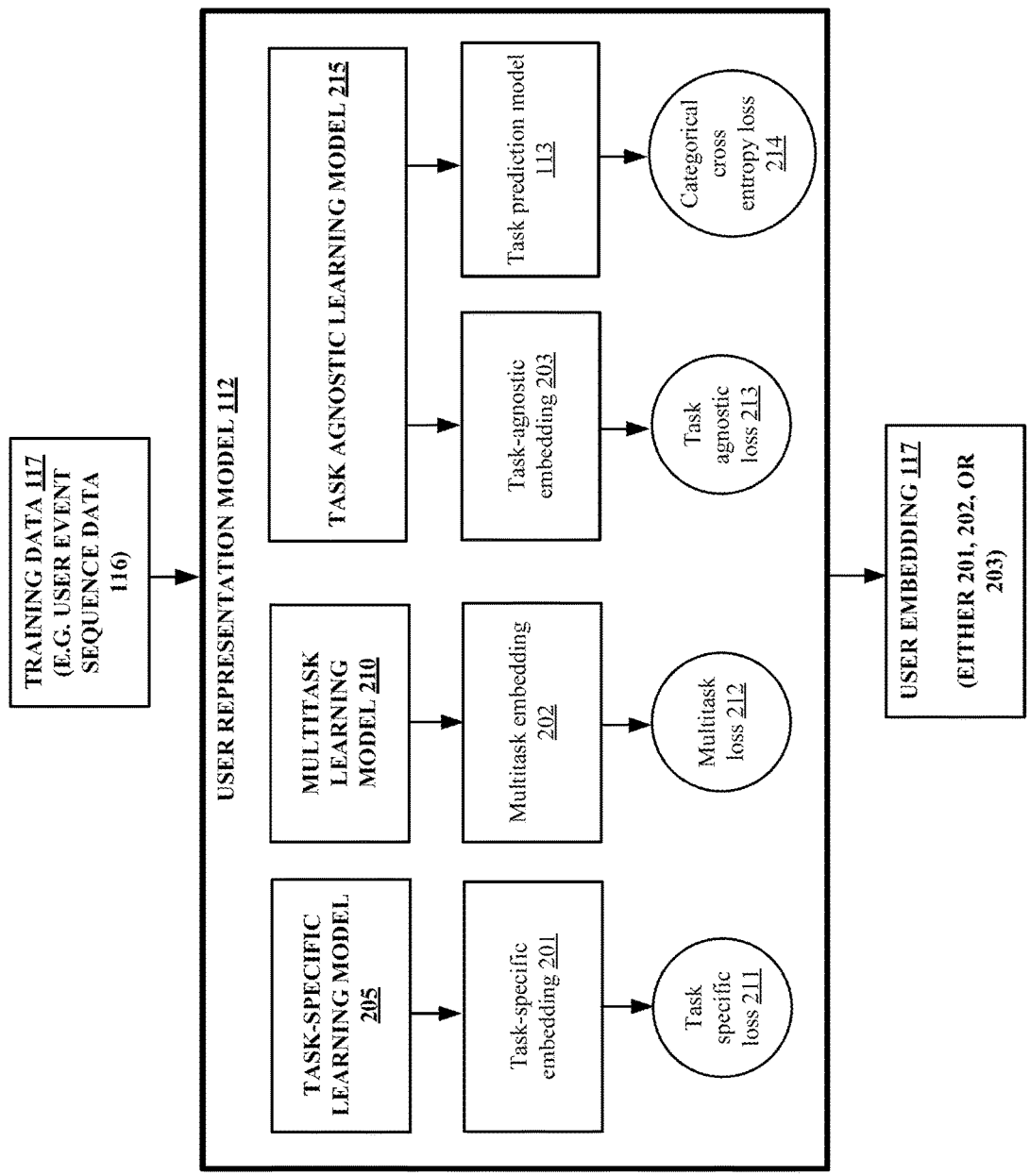
FIG. 2 depicts an example illustration of a user representation model for use in the computing environment of FIG. 1, according to certain embodiments disclosed herein.

FIG. 2 depicts an illustration of a user representation model 112 for use in certain embodiments described herein, for example as described FIG. 1 and FIG. 3. As depicted in FIG. 2, the user representation model 112 comprises either a task specific learning model 205, a multitask learning model 210, or a task agnostic learning model 215. For example, in one embodiment, the user representation model 112 includes a task specific learning model 205 and generates a user representation 117 in the form of a task specific embedding 201. In another embodiment, the user representation model 112 includes a multitask learning model 210 and generates a user representation 117 in the form of a multitask embedding 202. In yet another embodiment, the user representation model 112 includes a task agnostic learning model 215 and generates a user representation 117 in the form of a task agnostic embedding 203. An example process for applying the user representation model 112 to user event sequence data 115 is described in FIG. 3.

In certain examples, as depicted in FIG. 2, the user representation model 112 receives the user event sequence data 115, for example, associated with a user profile. The user representation model 112, which includes one of the models 205, 210, or 215, generates the user representation 117 The user representation 117 (whether in the form of task specific embedding 201, a multitask embedding 202, or a task agnostic embedding 203) comprises a fixed dimensional vector (e.g. a 16-dimension vector) that represents the user event sequence data 115. Specific details about embodiments of the user representation model 117 which include the task specific learning model 205, the multitask learning model 210, or the task agnostic learning model 215 are described herein. In certain embodiments, an operator of the service system 101 and/or of the hub system 110 may configure the user representation model 117 to include a selected one of the task specific learning model 205, the multitask learning model 210, or the task agnostic learning model 215. For example, the operator may evaluate a performance of each of the task specific embedding 201, the multitask embedding 202, or the task agnostic embedding 203 using the task prediction model 113. In this example, the operator may configure the user representation model 117 to include the task specific learning model 205, the multitask learning model 210, or the task agnostic learning model 215 based on the performance of each of the embeddings 201, 202, 203 generated by the respective models 205, 210, and 215. For example, in some instances, the multitask model performs better (e.g. results in an increased accuracy of task predictions 139) according to the task prediction model 113.

In certain embodiments, the user representation model 117 includes a task specific learning model 205 configured to generate a user representation 117 in the form of a task specific embedding 201. In certain embodiments, the task specific learning model 205 is trained using the task prediction model 113 to learn a dependencies or other relationships between a particular downstream task and the sequence of user events within the training data set 116, which comprises a subset of the user event sequence data 115. The particular task may be, for example, a product purchase.

In a simple illustration, the training data set 116, which comprises a subset of the user event sequence data 115, describes an event sequence of: {views merchant website homepage Apr. 7, 2022 10:15; adds product X to virtual shopping cart Apr. 7, 2022 10:17; purchases product X Apr. 7, 2022 10:18}. Based on the time of occurrence information for each of the three events, the "purchases product X" event is downstream of the "adds product X to the virtual cart" event, which is in turn downstream of the "views merchant website homepage" event. In this example, the "purchases product X" event corresponds to the task to be predicted using the task specific embedding 201. The training data set 116 includes target labels to indicate this correspondence.

In certain embodiments, the task specific learning model 205 includes a 2-layered long short-term memory ("LSTM") network and generates a task specific embedding 201 that is the same as a dimension of a last hidden state of the LSTM layers. In certain embodiments, the task specific learning model 205 includes an embedding layer that converts a one-hot representation of input events from the user event sequence data 115 into a fixed dimensional embedding. In certain examples, the fixed dimensional embedding is a fixed 16-dimensional embedding.

The output of the LSTM layers of the task specific learning model 205 is passed to the task prediction model 113. In some embodiments, the task prediction model 113 is a 2-layered fully connected neural network having a single neuron output that predicts whether the output is positive or not. The fully connected layer acts as an inference engine. In certain embodiments, the task prediction model 113 determines the prediction power of the task specific embedding 201 by computing a task specific loss 211. For example, the task specific loss 211 is a weighted binary cross entropy ("wBCE") loss function and is represented as follows:

$$H_{y'}(y) := -(w_0(y')\log(y) + w_1(1-y')\log(1-y)) \quad (1),$$

where $w_0$ and $w_1$ represent weights, y represents a predicted outcome (e.g. a predicted downstream task) and y' represents the ground truth outcome (e.g. the actual downstream task that occurs). For example, the predicted downstream task is a product purchase and the ground truth outcome is either that the user actually purchased a product or that the user did not purchase a product. If the task specific loss 211 is determined to be too great, e.g., exceeds a particular threshold, one or more parameters of the task specific learning model 205 can be modified to generate a better performing task specific embedding 201.

In certain embodiments, the user representation model 112 includes a multitask learning model 210 that is configured to generate a user representation 117 in the form of a multitask embedding 202. In certain embodiments, the multitask learning model 210 is configured to learn dependencies between user event sequences in the training data 116 and each of multiple downstream tasks. For example, if the multitask learning model 210 is configured to predict k tasks $\{e_1, e_2, \ldots, e_k\}$, the multitask embedding 202 will not only include a dependency relation between task $e_i$ and the upstream user event sequence, but will include a dependency of the particular task $e_i$ with all other tasks $e_j$, $j \in \{1, \ldots, k\}$, $j \neq i$. Similarly to the task specific learning model 205, the multitask learning model 210 includes a fixed dimensional embedding layer (e.g. a 32-dimensional embedding layer) followed by a 2-layered LSTM model. An output of the 2-layered LSTM model serves as the multitask embedding 202.

The task prediction model 113 used with the multitask learning model 210 includes k 2-layered fully connected neural networks corresponding to the k individual tasks. Each of the fully connected network heads has a single neuron in its outer layer that predicts a positive/negative target for the corresponding task. In certain embodiments, the task prediction model 113 determines a multitask loss 212 (e.g. a wBCE loss) for the individual heads, which can be represented as:

$$H_{y'}(y) := -\sum_{i=1}^{k}(w_{i0}(y'_i)\log(y_i) + w_{i1}(1-y'_i)\log(1-y_i)), \quad (2)$$

where $w_{i0}$ and $w_{i1}$ are weights, $y_i$ is a predicted task and $y'_i$ is a corresponding ground truth. As shown in Equation 2, the multitask loss 212 is a sum of losses corresponding to the individual tasks of the k tasks to be predicted. If the multitask loss 212 is determined to be too great, e.g., exceeds a particular threshold, one or more parameters of the multitask learning model 210 can be modified to generate a better performing multitask embedding 202.

In certain embodiments, the user representation model 117 includes a task agnostic learning model 205 that is configured to generate a user representation 117 in the form of a task agnostic embedding 203. Unlike the task specific model 205 and the multitask model 205, the task agnostic embedding is "task agnostic" because it does not learn dependency relationships between events within the user event sequence data 115 and downstream tasks. In certain embodiments, the task agnostic model 215 generates the task agnostic embedding 203 using an autoencoder model.

In certain embodiments, the task agnostic learning model 215 uses a single layered LSTM as the architecture for the encoder and decoder and the user event sequence is input to the encoder LSTM, which generates the task agnostic embedding 203. The task agnostic embedding 203 is input to the decoder LSTM to generate back the user behavior sequence. The task agnostic learning model 215 determines a task agnostic loss 213, for training the autoencoder model. In some examples, the task agnostic loss 213 is a mean squared error loss that is computed from the input sequence and the output sequence of the decoder. If the task agnostic loss 213 is determined to be too great, e.g., exceeds a particular threshold, one or more parameters of the task agnostic learning model 215 can be modified to generate a better performing task agnostic embedding 203.

The task agnostic embedding 203 generated by the task agnostic learning model 215 can be used by the task prediction model 113 to predict tasks downstream from the user event sequence. In this case, the task prediction model 113 includes a 2-layered fully connected network, similar to the configuration used with the task specific learning model 205. However, here the task prediction model 113 is trained separately from the task agnostic learning model 215 and uses categorical cross-entropy loss 214 as the loss function.

In certain embodiments, the training data 116 used to train the user representation model 112 include a set of labeled training data received from one or more edge systems 130 that perform a set of machine learning processes. However, the user representations 117 generated by the representation model 112 are broadly transferrable to a variety of machine learning based services, including machine learning processes that are not associated with the set of machine learning processes associated with the training data 116 ("out-of-target" processes). For example, the user representation model 112 is trained to generate a user representation 117 using training data 116 associated with a prediction service but the user representation 117 can be used in processes other than the prediction service, such as a classification service. While conventional service systems would increase a number of computed attributes as a number of out-of-target machine learning based processes offered increases, the transferability of the user representations 117 generated via the user representation model 112 described herein reduces storage overhead by enabling use of a fixed-size common user representation 117 even as new out-of-target processes are introduced by service systems.

Examples of Computer-Implemented Operations for Generating a User Representation Based on User Event Sequence Data FIG. 3 depicts an example of a method 300 for generating a user representation 117 by applying the user representation model 112 of FIG. 2 to the user training data 116, according to certain embodiments disclosed herein. One or more computing devices (e.g., the hub system 110 or the individual subsystems and modules contained therein) implement operations depicted in FIG. 3. For illustrative purposes, the process 300 is described with reference to certain examples depicted in the figures. Other implementations, however, are possible.

At block 310, the method 300 involves accessing a training data set 116, which comprises a subset of user event sequence data 115 associated with a user identifier. In certain examples, the representation generator subsystem 111 accesses the training data set 116 associated with the user identifier. In certain examples, the hub system 110 stores the training data set 116 in the data store 114 and the representation generator subsystem 111 accesses the training data set 116 in the data store 114. In certain examples, training data set 116 includes a time series of events and includes, for each event, an event type and a time of occurrence of the event. In certain examples, the representation generator subsystem 111 generates the user event sequence data 115 from raw user profile data 118. For example, in some instances, raw user profile data 118 includes user event data 119, which the representation generator subsystem 111 chronologically orders to generate the user event sequence data 115. Examples for generating user event sequence data 115 from user profile data 118 are described in FIG. 4 herein.

At block 320, the method 300 involves applying a user representation model 112 to the training data set 116 to generate a user representation 117. In some embodiments, implementing block 320 includes implementing one of blocks 321 (generating a task specific embedding 201 using a task specific learning model 205), 323 (generating a multitask embedding 202 using a multitask learning model 210), or 325 (generating a task-agnostic embedding 203 using a task-agnostic learning model 215). The user representation 117, whether in the form of task specific embedding 201, a multitask embedding 202, or a task agnostic embedding 203, comprises a fixed dimensional vector (e.g. a 16-dimension vector) that represents the user event sequence data 115. As described above, a task prediction model 113 is used to train the task specific learning model 205 and the multitask learning model 210 when generating the task specific embedding 201 and the multitask embedding 202, respectively. A task prediction model 113 is used in conjunction and trained in sequence with task-agnostic prediction model 215 when generating the task-agnostic embedding.

At block 330, the method 300 involves transmitting the user representation 117 to the edge system 130, wherein the edge system 130 applies one or more machine learning based service 133 to the user representation 117 to generate a prediction 139. In some embodiments, the hub system 110 stores the selected user representation 117 in the data store 114, which is accessible to the edge system 130, and the edge system 130 accesses the user representation 117 via the network 125. In some embodiments, the machine learning based service 133 includes the same or substantially the same task prediction model 113 that was used to train the user representation model 112 on the hub system. The machine learning service 133 can thus use the user representation 117 to generate a task prediction 139 based on live user event data received from the edge client 140. The task predictions 139 can be used for or factored into the service output.

Certain embodiments for creating concise user representations 117, as described herein, reduces space requirements so that user profile information can be cached at the edge system 130 for faster prediction of downstream tasks, without compromising a statistical performance. For example, a predetermined size of the user representation 117 can be configured. For example, the predetermined size corresponds to a number of dimensions. For example, the predetermined size comprises 8 dimensions, 16 dimensions, 32 dimensions, 64 dimensions, or other number of dimensions for the user representation 117. In some embodiments, increasing the predetermined size of the user representation 117 increases a storage requirement of the user representation 117. However, in these embodiments, a total active memory used for generation of the prediction 139 does not substantially increase in proportion to an increase in predetermined size of the user representation 117. For example, in some instances, an active memory usage is 9.70 megabytes (Mb) for an 8-dimensional user representation, 11.62 Mb for a 16-dimensional user representation 137, 19.43 Mb for a 32-dimensional user representation 117, and 34.76 Mb for a 64-dimensional user representation 117. Further, in certain embodiments, an inference time decreases as a predetermined size of the user representation 117 decreases. In certain embodiments, reducing the predetermined size (e.g. from 32 to 16 dimensions, from 16 to 8 dimensions, etc.) for the user representation 117 does not substantially compromise on statistical performance of prediction 139 steps.

Examples of Generating User Event Sequence Data from User Profile Data

Figure 4:
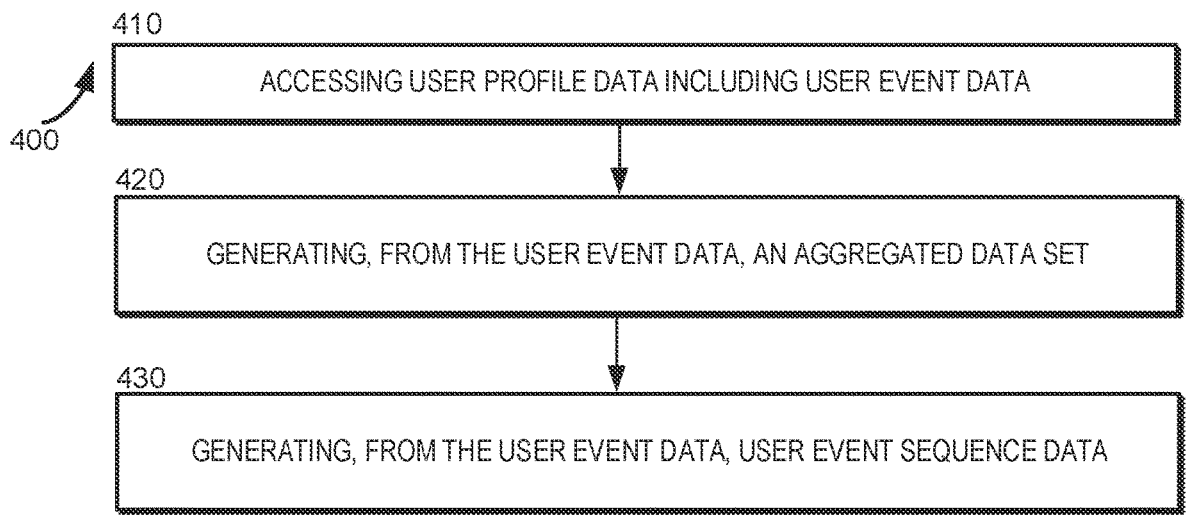
FIG. 4 depicts a method for generating user event sequence data, according to certain embodiments disclosed herein.

FIG. 4 depicts an example method 400 for generating user event sequence data 115, according to certain embodiments disclosed herein. For illustrative purposes, the method 400 is described with reference to certain examples depicted in the figures. Other implementations, however, are possible.

In block 410, the method 400 involves accessing user profile data 118 including user event data 119. For example, the representation generator subsystem 111 accesses the user profile data 118 from the data store 114. The user event data 119 represents events, which include interactions between the user and the service system 101 (for example, interactions with one or more edge systems 130 of the service system 101). The events each include a time stamp identifying a time of occurrence of the event as well as an event type label identifying a type of event. An event type can be a webpage view, a click, a hover event, or other user interface based interaction type with the service system via an edge client 140. In some instances, the event type can include a purchase, a conversion, a receipt of email or other communications, an unsubscription or subscription to a service, or other event type. In certain embodiments, the hub system 110 logs the user event data 119. For example, the user event data 119 may be collected, in some instances, from applications executing on the edge client 140 (e.g. user computing device) associated with the user. For example, the user interacts with one or more services of the service system 101 (e.g. via a web browser application or standalone service system application downloaded onto the user computing device) and the service system 101 logs events of the user, for example clicks, pages visited, items purchased, items added to a shopping cart, items viewed, as well as time stamps indicating a date/time associated with each of the events, to generate event sequence data associated with the user.

In block 420, the method 400 involves generating, from the user event data 119, an aggregated data set. For example, the representation generator subsystem 111 generates the aggregated data set. The aggregated data provides information about and represents the user's overall behavior while the user interacts with the service system 101, but does not include any individual event information. In certain examples, the aggregated data set includes attributes computed from the user event data 119. For example, the aggregated dataset can capture a most likely behavior of a user while performing a particular event (e.g. downloading an application) or a mean time between two successive events. In certain examples, the aggregated data set is divided into sections based on time periods. For example, the aggregated data set could include three sections of event data, each section corresponding to one or more week worth of event data. A first section of the aggregated data set could include attributes computed from user event data 119 generated during a first week. A second section of the aggregated data set could include attributes computed from user event data 119 generated during the first week and a second. A third section of the aggregated data could include attributes computed from user event data 119 generated during the first week, the second week, and a third week.

In block 430, the method 400 involves generating, from the user event data 119, user event sequence data 115. The user event data 119 includes, for each of a set of events (e.g. interactions of the user with the service system 101), an event type and time stamp information indicating a time of occurrence of the event. The representation generator subsystem 111 generates the user event sequence data 115 by chronologically ordering the user event data 119 based on the time stamp information associated with each event. In certain examples, the user event sequence data 115 comprises, for each event type, a chronological sequence of user events determined from the user event data 119. In certain examples, the user event sequence data 115 is a time series of events showing a time at which each event occurred. In certain examples, the representation generator subsystem 111 determines a time gap between events and the user event sequence data 115 includes a time gap between events in the sequence of events. For example, the time gap represents an amount of time that passes between an event in the user event sequence data 115 and an event that precedes the event. The representation generator subsystem 111 stores the user event sequence data 115 in the data store 114.

The representation generator subsystem 111 can access the user event sequence data 115 generated in block 430 and apply the user representation model 119 to the user event sequence data 115 to generate a user representation 117, as illustrated in FIG. 2. The hub system 110 can apply method 300 illustrated in FIG. 3 to generate a user representation 117 based on the user event sequence data 115 generated in block 430 of FIG. 4. In certain embodiments, at least some of the user event sequence data 115 is used as a training data set 116 to generate target labels of a subsequent time period. For example, principal target labels of a subsequent week (e.g. week 2) can be predicted from target labels of a previous week (e.g. week 1) and then compared against ground truth values.

Figure 5:
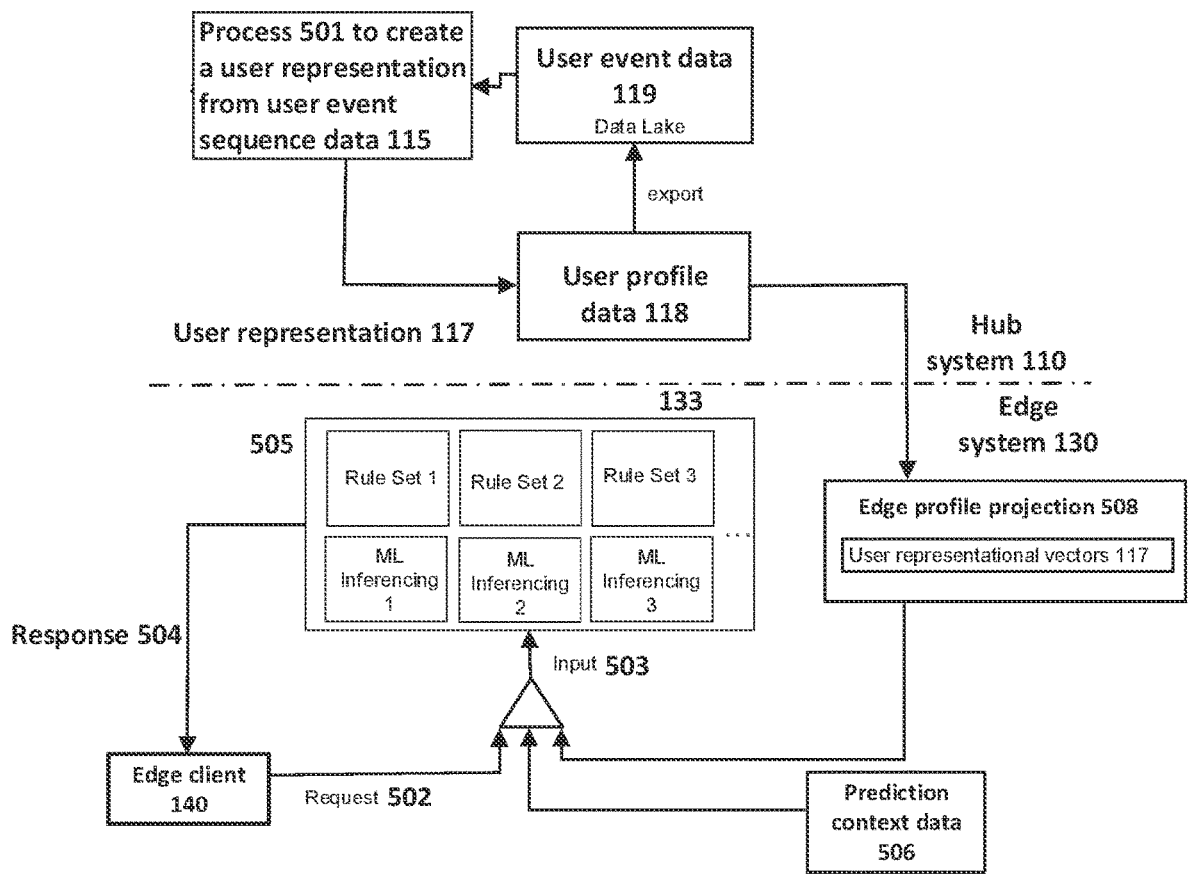
FIG. 5 depicts an example illustration of a service system, in which a user representation is created at a hub system and is transmitted to an edge system, where it is used to provide machine learning based services to an edge client, according to certain embodiments disclosed herein.

FIG. 5 depicts an example illustration 500 of generating, by a hub system 110, a user representation 117 for storage and subsequent projection to an edge system 130, which can provide machine learning based services to an edge client 140, according to certain embodiments disclosed herein. As shown in FIG. 5, the hub server 110 can export user event data 119 from user profile data 118 (e.g. stored on data store 114) to a data lake, where it is stored in an unstructured form. In some instances, as indicated in FIG. 5, the hub system 130 extracts user event data 119 from user profile data 118 and generates the user event sequence data 115 from the user event data 119.

The hub system 110 computes a process 501 to create a user representation 117 from user event sequence data 115 generated from the user event data 119. The process 501 to create a user representation 117 from the user event sequence data 115, in some embodiments, involves performing the method 300 of FIG. 3. As illustrated in FIG. 5, the hub system 110 can store the user representation 117 in or in association with the user profile data 118 (e.g. in the data store 114). As illustrated in FIG. 5, the hub system 110 projects the user representation 117 to an edge system 130, where is it stored in an edge profile projection 508. A number of user segments and other attributes may be stored in the edge profile projection 508, which may have been received from the hub system and/or collected by the edge system 130 from the edge client 140.

The edge system 130 provides input 503 to the machine learning based services 133 in the form of a request 502 from the edge client 140. As illustrated in FIG. 5, the input 503 to the machine learning based services 133 also includes, in some instances, the user representation 117 and possible other information from the edge profile projection 508. In an example where the machine learning based services 133 are used to predict and provide content that may be of interest to the user, the input to the machine learning services 133 may further include prediction context data 506, such as an item list, an offer catalog, a content catalog, or other context data. In certain embodiments, as illustrated in FIG. 5, the machine learning based services 133 are provided by one or more machine learning inferencing models or processes supplemented by rules. The output from the machine learning based services 133 may be in the form of response 504 to the edge client 140. The response 504 could include an offer recommendation selected from an offer catalog or some other recommended or targeted content based on content items listed or referenced in the prediction context data 506. It should be noted that in some examples, one or more of the edge system 130 or the hub system 110 can apply rule sets to determine content for the response 504 based on outputs (e.g. predictions 139) of ML inferencing processes.

Figure 6:
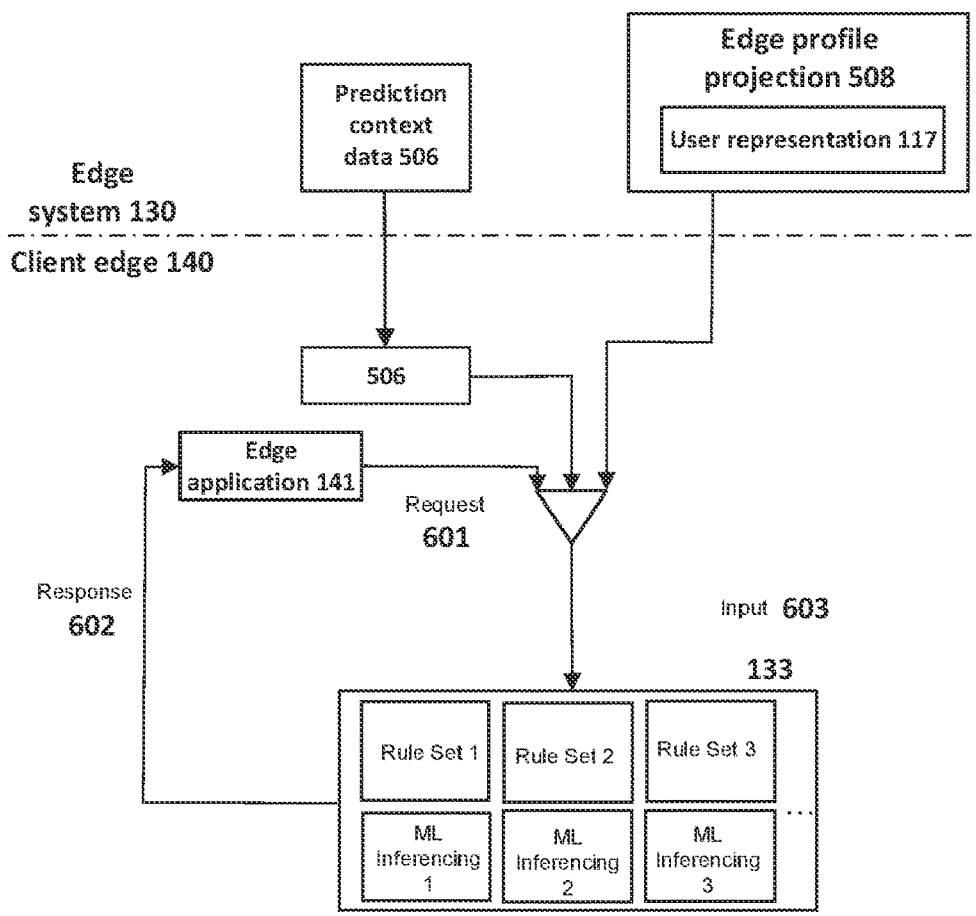
FIG. 6 depicts an example illustration of service system, in which an edge system provides a user representation to an edge client, where it is used to perform on-device machine learning based services, according to certain embodiments disclosed herein.

FIG. 6 depicts an example illustration 600 of performing, by an edge client 140, machine learning based services 133 using a user representation 117 received from an edge system 130, according to certain embodiments disclosed herein. For example, instead of the edge system 130 applying the ML based decisioning services 133, as illustrated in FIG. 5, the edge client 140 performs the ML based services 133. In the embodiment illustrated in FIG. 6, the edge client 140 receives the user representation 117 (and possibly other data from the edge projection profile 508) and the prediction context data 506 from the edge system 130. Input to the machine learning based services 133 can include a request 601 from an edge client application 141. The input 603 also includes, in some instances, the user representation 117 and possibly other information from the edge projection profile 508, along with prediction context data 506 received from the edge system 130. The ML based decisioning 133 are provided by one or more machine learning inferencing models or processes supplemented by various rule sets. The output from the machine learning based services 133 may be in the form of a response 602 to the edge client application 141. The response 602 could include an offer recommendation selected from an offer catalog or some other recommended or targeted content based on content items listed or referenced in the prediction context data 506.

Examples of Computing Environments for Implementing Certain Embodiments

Figure 7:
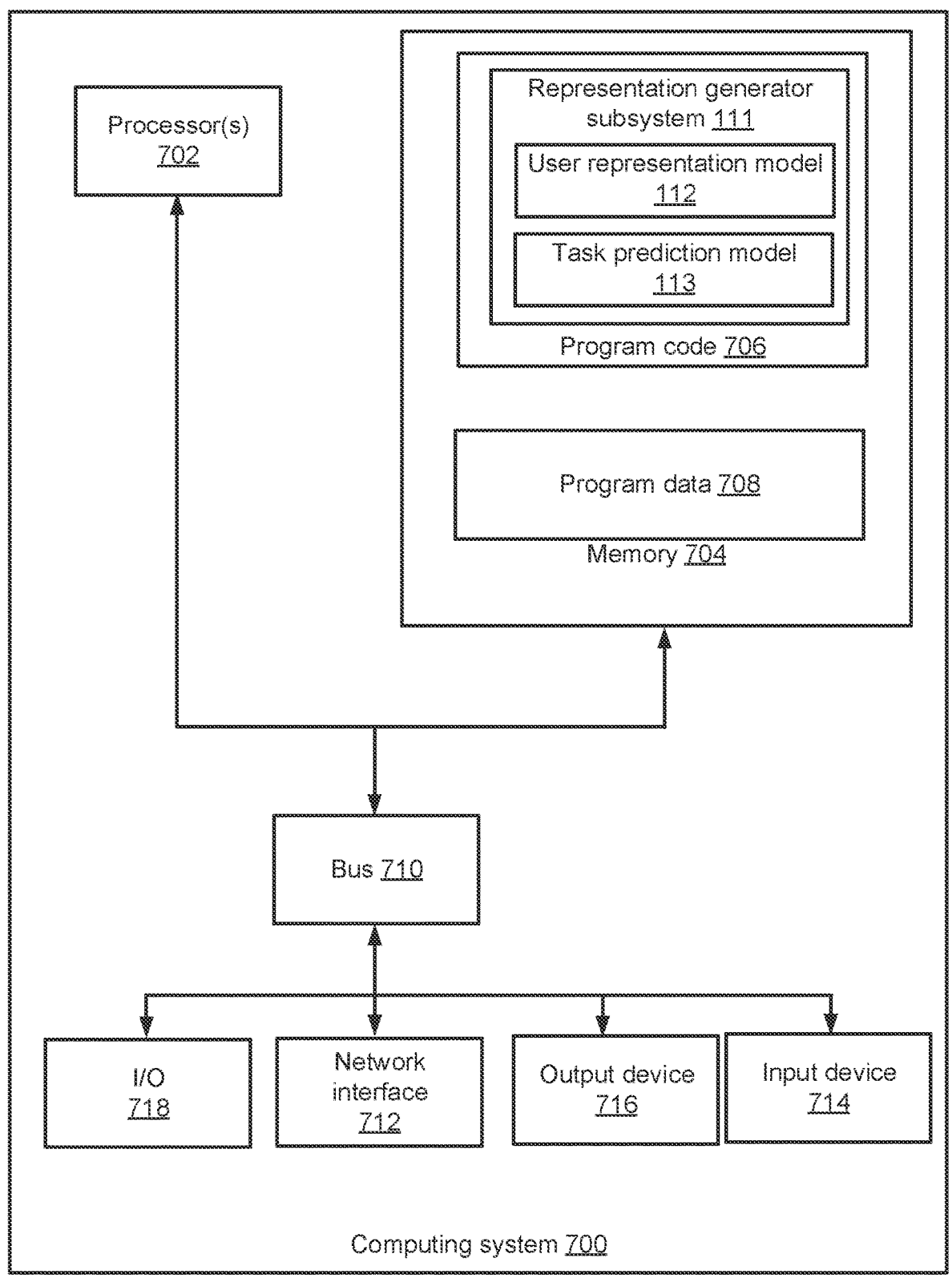
FIG. 7 depicts an example of a computing system that performs certain operations described herein, according to certain embodiments described in the present disclosure.

Any suitable computer system or group of computer systems can be used for performing the operations described herein. For example, FIG. 7 depicts an example of a computer system 700. The depicted example of the computer system 700 includes a processing device 702 communicatively coupled to one or more memory components 704. The processing device 702 executes computer-executable program code stored in a memory components 704, accesses information stored in the memory component 704, or both. Execution of the computer-executable program code causes the processing device to perform the operations described herein. Examples of the processing device 702 include a microprocessor, an application-specific integrated circuit ("ASIC"), a field-programmable gate array ("FPGA"), or any other suitable processing device. The processing device 702 can include any number of processing devices, including a single processing device.

The memory components 704 includes any suitable non-transitory computer-readable medium for storing program code 706, program data 708, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory components 704 can be volatile memory, non-volatile memory, or a combination thereof.

The computer system 700 executes program code 706 that configures the processing device 702 to perform one or more of the operations described herein. Examples of the program code 706 include, in various embodiments, the hub system 110 (including the representation generator subsystem 111, including the user representation model 112 and the task prediction model 113) of FIG. 1, which may include any other suitable systems or subsystems that perform one or more operations described herein (e.g., one or more neural networks, encoders, attention propagation subsystem and segmentation subsystem). The program code 706 may be resident in the memory components 704 or any suitable computer-readable medium and may be executed by the processing device 702 or any other suitable processor.

The processing device 702 is an integrated circuit device that can execute the program code 706. The program code 706 can be for executing an operating system, an application system or subsystem, or both. When executed by the processing device 702, the instructions cause the processing device 702 to perform operations of the program code 706. When being executed by the processing device 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 704 store the program data 708 that includes one or more datasets described herein. In some embodiments, one or more of data sets are stored in the same memory component (e.g., one of the memory components 704). In additional or alternative embodiments, one or more of the programs, data sets, models, and functions described herein are stored in different memory components 704 accessible via a data network. One or more buses 710 are also included in the computer system 700. The buses 710 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 712.

The computer system 700 may also include a number of external or internal devices, an input device 714, a presentation device 716, or other input or output devices. For example, the computer system 700 is shown with one or more input/output ("I/O") interfaces 718. An I/O interface 718 can receive input from input devices or provide output to output devices. An input device 714 can include any device or group of devices suitable for receiving visual, auditory, or other suitable input that controls or affects the operations of the processing device 702. Non-limiting examples of the input device 714 include a touchscreen, a mouse, a keyboard, a microphone, a separate mobile computing device, etc. A presentation device 716 can include any device or group of devices suitable for providing visual, auditory, or other suitable sensory output. Non-limiting examples of the presentation device 716 include a touchscreen, a monitor, a speaker, a separate mobile computing device, etc.

Although FIG. 7 depicts the input device 714 and the presentation device 716 as being local to the computer system 700, other implementations are possible. For instance, in some embodiments, one or more of the input device 714 and the presentation device 716 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 8:
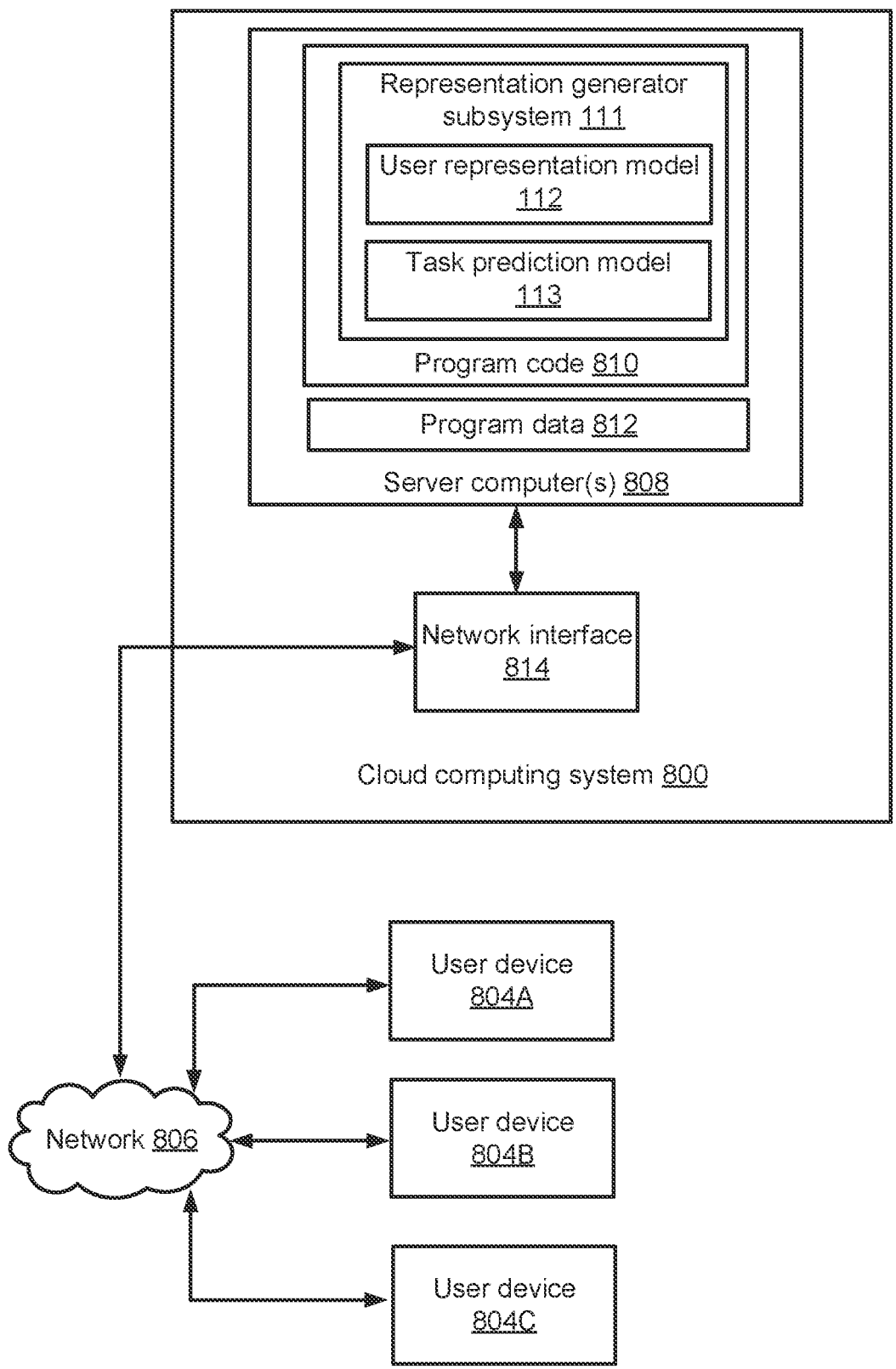
FIG. 8 an example of a cloud computing system that performs certain operations described herein, according to certain embodiments described in the present disclosure.

In some embodiments, the functionality provided by computer system 700 may be offered as cloud services by a cloud service provider. For example, FIG. 8 depicts an example of a cloud computer system 800 offering a service for generating a user representation 117 from user event sequence data 115, that can be used by a number of user subscribers using user devices 804A, 804B, and 804C across a data network 806. In the example, the service for generating a user representation 117 from user event sequence data 115 may be offered under a Software as a Service (SaaS) model. One or more users (e.g. edge systems 130 of the service system 101 or edge systems of systems outside of the service system 101) may subscribe to the service for generating a user representation 117 from user event sequence data 115, and the cloud computer system 800 performs the processing to provide the service for generating a user representation 117 from user event sequence data 115 to subscribers. The cloud computer system 800 may include one or more remote server computers 808.

The remote server computers 808 include any suitable non-transitory computer-readable medium for storing program code 810 (e.g., the representation generator subsystem 111, including the user representation model 112 and the task prediction model 113 of FIG. 1) and program data 812, or both, which is used by the cloud computer system 800 for providing the cloud services. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 808 can include volatile memory, non-volatile memory, or a combination thereof.

One or more of the server computers 808 execute the program code 810 that configures one or more processing devices of the server computers 808 to perform one or more of the operations that provide user representations 117. As depicted in the embodiment in FIG. 8, the one or more servers providing the services for generating a user representation 117 from user event sequence data 115 may implement the representation generator subsystem 111, including the user representation model 112 and the task prediction model 113. Any other suitable systems or subsystems that perform one or more operations described herein (e.g., one or more development systems for configuring an interactive user interface) can also be implemented by the cloud computer system 800.

In certain embodiments, the cloud computer system 800 may implement the services by executing program code and/or using program data 812, which may be resident in a memory component of the server computers 808 or any suitable computer-readable medium and may be executed by the processing devices of the server computers 808 or any other suitable processing device.

In some embodiments, the program data 812 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 806.

The cloud computer system 800 also includes a network interface device 814 that enable communications to and from cloud computer system 800. In certain embodiments, the network interface device 814 includes any device or group of devices suitable for establishing a wired or wireless data connection to the data networks 808. Non-limiting examples of the network interface device 814 include an Ethernet network adapter, a modem, and/or the like. The user representation 117 generation service is able to communicate with the user devices 804A, 804B, and 804C via the data network 808 using the network interface device 814.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A system comprising:
a representation generator subsystem configured to execute a user representation model and a task prediction model to generate a user representation for a user, wherein:
the user representation model comprises a machine learning model trained to generate a user representation based on user event sequence data, the user event sequence data comprising high-dimensional data representing sequences of user interactions by the user with the system,
the user representation comprises one of a task specific embedding or a multitask embedding, each of which comprises a low-dimensional representation of the user event sequence data expressed as a vector of a predetermined size,
the task prediction model is used to train the user representation model with a training data set comprising a subset of the user event sequence data, wherein the training comprises applying a loss function to an output of the user representation model to assess a prediction power of the user representation, and if a loss determined by the loss function exceeds a predetermined threshold, one or more parameters of the user representation model are iteratively modified until the loss determined by the loss function does not exceed the threshold; and a data store configured for storing the user representation in a user profile associated with the user, wherein a storage space requirement of the user representation in the data store is less than a storage space requirement of the user event sequence data.

2. The system of claim 1, wherein the user representation model comprises an autoencoder network including a single-layer LSTM encoder and a single-layer LSTM decoder.

3. The system of claim 1, wherein the user representation model comprises a two-layered long short-term memory ("LSTM") network.

4. The system of claim 1, wherein the vector has a predefined number of dimensions.

5. The system of claim 1, wherein the user interactions with the system comprise one or more of conversions or user interface interactions.

6. A non-transitory computer-readable medium storing executable instructions, which when executed by a processing device, cause the processing device to:

execute a user representation model and a task prediction model to generate a user representation for a user, wherein:

the user representation model comprises a machine learning model trained to generate a user representation based on user event sequence data, the user event sequence data comprising high-dimensional data representing sequences of user interactions by the user with a system;

the user representation comprises one of a task specific embedding or a multitask embedding, each of which comprises a low-dimensional representation of the user event sequence data expressed as a vector of a predetermined size, the task prediction model is used to train the user representation model with a training data set comprising a subset of the user event sequence data, wherein the training comprises applying a loss function to an output of the user representation model to assess a prediction power of the user representation; and if a loss determined by the loss function exceeds a predetermined threshold, one or more parameters of the user representation model are iteratively modified until the loss determined by the loss function does not exceed the threshold; and store the user representation in a user profile associated with the user, wherein a storage space requirement of the user representation is less than a storage space requirement of the user event sequence data.

7. The non-transitory computer readable medium of claim 6, wherein the user representation model comprises a two-layered long short-term memory ("LSTM") network.

8. The non-transitory computer readable medium of claim 6, wherein the user representation model comprises an autoencoder network including a single-layer LSTM encoder and a single-layer LSTM decoder.

9. A method, comprising:

executing a user representation model and a task prediction model to generate a user representation for a user, wherein;

the user representation model comprises a machine learning model trained to generate a user representation based on user event sequence data, the user event sequence data comprising high-dimensional data representing sequences of user interactions by the user with a system;

the user representation comprises one of a task specific embedding or a multitask embedding, each of which comprises a low-dimensional representation of the user event sequence data expressed as a vector of a predetermined size the task prediction model is used to train the user representation model with a training data set comprising a subset of the user event sequence data, wherein the training comprises applying a loss function to an output of the user representation model to assess a prediction power of the user representation; and if a loss determined by the loss function exceeds a predetermined threshold, one or more parameters of the user representation model are iteratively modified until the loss determined by the loss function does not exceed the threshold; and storing the user representation in a user profile associated with the user, wherein a storage space requirement of the user representation is less than a storage space requirement of the user event sequence data.

10. The method of claim 9, wherein the user representation model comprises a two-layered long short-term memory ("LSTM") network.

11. The method of claim 9, wherein the user representation model comprises an autoencoder network including a single-layer LSTM encoder and a single-layer LSTM decoder.

* * * * *